3,056,843
REACTION OF HEXAHALOBENZENES WITH POLYOLS AND PRODUCTS OBTAINED THEREBY
Marco Wismer, Gibsonia, Pa., assignor to Pittsburgh Plate Glass Company, a corporation of Pennsylvania
No Drawing. Filed Oct. 5, 1959, Ser. No. 844,180
8 Claims. (Cl. 260—613)

This invention relates to novel halogen containing compounds useful in the preparation of epoxy resins, polyester resins, and other materials, and pertains more particularly to compounds obtained by the reaction of hexahalobenzenes with polyols.

It is known that hexahalobenzenes when heated in the presence of an alkali metal hydroxide and an alkanediol undergo hydrolysis to give relatively high yields of pentachlorophenol. This process is described, for example, in U.S. Patent 2,692,899.

The surprising discovery has now been made that when certain polyols containing 3 or 4 hydroxyl substituents are admixed with hexahalobenzenes, and particularly hexachlorobenzene, in the presence of a hydrogen chloride acceptor, and in a solvent, hydrolysis of the hexachlorobenzene does not occur, but instead novel diols or triols are obtained, depending upon whether the starting polyol contains 3 or 4 hydroxyl groups. In its most simple form, the reaction of this invention involves bringing together approximately equimolar quantities of a hexahalobenzene with a polyol, whereupon reaction takes place substantially according to the following equation; wherein the triol, trimethylol propane, is utilized for illustrative purposes:

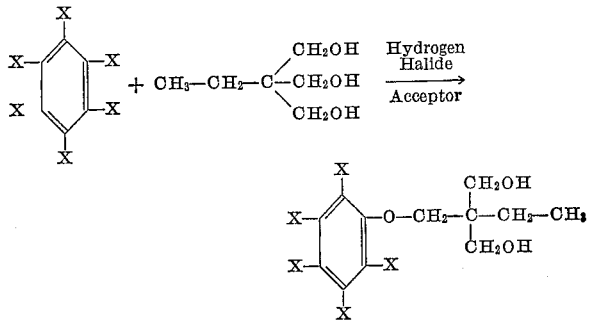

wherein each X is halogen such as chlorine, fluorine, bromine, or iodine.

Regardless of the ratio in which the reactants are charged, the primary reaction consists in the removal of a single halogen atom from the hexahalobenzene during the reaction, this being due apparently to the fact that after one halogen atom is removed the remaining 5 halogen atoms become stabilized on the benzene nucleus.

Compounds prepared according to this invention react readily with unsaturated dicarboxylic acids such as maleic acid (or anhydride) to form unsaturated polyesters which can be combined with monomeric materials containing a terminal $CH_2=C<$ group, such as styrene, vinyl toluene, diallyl phthalate, or the like, to give polymerizable resinous materials which cure to a hard, flame resistant state.

It has been demonstrated that secondary hydroxyl groups react slower with carboxylic acids than primary hydroxyl groups. Especially in the presence of a pentahalophenoxy group the steric hinderance affects will even further decrease the reactivity of a secondary OH group. It is therefore desirable to have a building block for polyesters which contains only primary hydroxyl groups. For this reason many of the components of this invention are particularly useful in polyester resin production.

Moreover, these compounds can be used in the preparation of saturated polyester resins which may be reacted with diisocyanates to produce cellular materials and surface coatings. These polyesters may also be useful fiber and film-forming materials. Oil modified alkyd resins having excellent water resistance can also be prepared from the compounds of this invention.

Additionally, the halogen containing compounds react readily with epihalohydrins such as epichlorohydrin to form epoxy resins which also possess excellent flame resistance in addition to possessing other useful properties.

Hexachlorobenzene, a solid melting at 227° C., is the preferred hexahalobenzene for reaction with polyols to form the novel compounds of this invention, particularly since it is readily available in commercial quantities and at low cost. However, other hexahalobenzenes, including hexabromobenzene, hexafluorobenzene, and hexaiodobenzene can also be used with good results.

The polyol which is utilized in the preparation of the novel compounds of this invention possesses the structure $$R(OH)n$$

wherein R is a saturated aliphatic hydrocarbon radical containing from 4 to 9 carbon atoms, and $n$ is a whole number from 3 to 4, at least two of the hydroxyl groups of said polyol being attached to a carbon atom or atoms which is in turn attached to a carbon atom free of hydroxyl substitution. It has been found that this particular molecular structure is necessary in order for the desired reaction to occur. For example, glycerol, which has each of its three hydroxyl groups attached to carbon atoms in turn attached to hydroxyl substituted carbon atoms, apparently will not undergo the reaction depicted structurally above.

Polyols which have the desired molecular configuration and which will react with hexahalobenzenes to form polyols include trimethylolethane, trimethylolpropane, trimethylolbutane, trimethylolpentane, trimethylolhexane, trimethylolheptane, pentaerythritol, and the like.

Preferably, the reaction of a hexahalobenzene with the polyol is carried out using substantially one molar proportion of the hexahalobenzene for each hydroxyl group of the polyol to be reacted. For example, if it is desired to react only one hydroxyl group of the polyol, one mole of the hexahalobenzene is employed per mole of the polyol, and if it is desired to react two hydroxyl groups of the polyol, two moles of the hexahalobenzene are utilized per mole of polyol. Thus the predominant reaction product possesses the following structure:

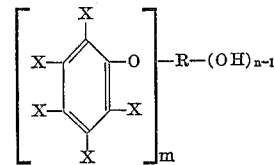

wherein R is a saturated aliphatic hydrocarbon radical containing from 4 to 9 carbon atoms, $m$ is a whole number from 1 to 12 and X and $n$ have the significance set forth herein, and wherein at least two hydroxyl groups of the compound are attached to a carbon atom or atoms in turn attached to a carbon atom free of hydroxyl substitution.

Best results are obtained when the reaction is conducted at elevated temperature in the presence of a solvent and a hydrogen halide acceptor. Useful hydrogen halide acceptors include various basic materials such as sodium hydroxide, sodium carbonate, potassium hydroxide, potassium carbonate, lithium hydroxide, lithium carbonate, pyridine, and the like. The hydrogen halide acceptor is ordinarily employed in approximately stoichiometric ratio with respect to the hexahalobenzene present in the reaction mixture, although larger or smaller amounts may be utilized if desired. The solvents which are employed in carrying out the reaction include the dialkyl ethers of glycols, for example, dimethoxymethane, dimethoxyethane, diethoxymethane, dipropoxyethane, dibutoxyethane, dimethyl ether of diethylene glycol, dimethyl ether of triethylene glycol, dibutyl ether of diethylene glycol, and the like, and the dialkyl substituted carboxylic acid amides such as dimethyl formamide, diethyl formamide, dibutyl formamide, dimethyl acetamide, diethyl acetamide, and the like.

In one preferred procedure for carrying out the reaction the polyol, the hydrogen halide acceptor, and solvent are admixed and heated to reflux temperature. The hexahalobenzene is then added incrementally over a period of approximately an hour or two, after which the mixture is refluxed for an additional period of time, normally from about 4 hours to 24 hours, or until the pH of the reaction mixture is approximately 7.0. The salt which forms during the reaction is then removed by filtering, after which the solvent is removed by vacuum distillation. The pure product is obtained in good yield, ordinarily in excess of 80 percent.

Alternatively, the reactants, hydrogen halide acceptor, and solvents can be admixed at one time, and the resulting mixture refluxed, and the product recovered as described above, although control of temperature is more difficult when the reaction is carried out in this manner.

The temperature at which the reaction is carried out may be varied widely although generally it is preferred to utilize temperatures at which the reactants will reflux, which in most instances will be in the range of about 150° C. to 165° C. Higher or lower temperatures, for example from about 50° C. to 200° C. may also be employed.

The following examples illustrate in detail the reaction of hexahalobenzenes with polyols in accordance with this invention, and the use of the resulting hydroxyl containing compounds in the preparation of polyester resins and epoxy resins. The examples are not intended to limit the invention, however, for there are, of course, numerous possible variations and modifications.

Example I

Sixty-seven (67) grams (0.5 mole) of trimethylolpropane, 20.2 grams (0.5 mole) of sodium hydroxide, and 1500 grams of 1,2-dimethoxyethane were charged into a glass reactor equipped with stirrer, reflux condenser, and thermometer. The resulting mixture was stirred and then heated to reflux. After reaching reflux temperature, 142.4 grams (0.5 mole) of hexachlorobenzene was added in 9 separate portions at 5 to 10 minute intervals over a period of about 60 minutes. The mixture was then refluxed for 17 hours after which the reaction mixture was found to be neutral. The sodium chloride was then removed by filtering. The theoretical quantity of sodium chloride was formed. The filtrate was filtered through a clay to give a clear colorless solution from which the 1,2-dimethoxyethane was distilled at 5 mm.–25 mm. of mercury to a pot temperature of 120° C. One hundred eighty-two and two-tenths (182.2) grams of a crystalline paste was obtained. After crystallization from absolute ethanol, pure 2 - pentachlorophenoxymethyl - 2 - ethyl-1,3-propane-diol (melting point 115.5° C.–118° C.) was obtained. Analysis:

|  | Theory For $C_{12}H_{13}Cl_5O_3$ | Found |
| --- | --- | --- |
| Percent Carbon | 37.65 | 37.77 |
| Percent Hydrogen | 3.43 | 3.44 |
| Percent Chlorine | 46.32 | 46.22 |
| OH Value | 294 | 306 |

Example II

A mixture was formed from the following materials:

Trimethylolpropane _____ 292.1 grams (2.18 moles).
Hexachlorobenzene _____ 621.0 grams (2.18 moles).
1,2-dimethoxyethane _____ 2180.0 grams.

The above mixture was heated and stirred to reflux temperature after which 90.6 grams (2.18 moles) of sodium hydroxide was added in 4 portions over a period of 70 minutes. After the sodium hydroxide addition was complete the reaction mixture was refluxed and stirred continuously for a period of 15 hours, and 3 additional grams of sodium hydroxide added in 3 portions with an interval of approximately 90 minutes between additions. The reaction mixture was then neutral to litmus paper. The reaction mixture was then filtered to remove salt formed during the reaction. The solvent was removed by distillation at reduced pressure, and after removal of unreacted hexachlorobenzene an 83.4 percent yield of product was obtained. The product had a hydroxyl value of 318 and was determined to be essentially pure 2-pentachlorophenoxymethyl-2-ethyl-1,3-propane-diol.

Example III

Example I was repeated except that one mole of trimethylolethane was substituted for the trimethylolpropane. The product obtained had a melting point of 140° C.–142° C., and had the following analysis:

|  | Theory For $C_{11}H_{11}Cl_5O_3$ | Found |
| --- | --- | --- |
| Percent Carbon | 35.84 | 36.02 |
| Percent Hydrogen | 2.99 | 3.09 |
| Percent Chlorine | 48.14 | 48.00 |
| OH Value | 303 | 299 |

The product according to the above analysis was 2-pentachlorophenoxymethyl-2-methyl-1,3-propane-diol.

Example V

Example II was repeated except that 600 grams of dimethyl formamide was utilized as a solvent and the molar ratio of reactants was changed. The molar ratios utilized were:

Trimethylolpropane _____ 111.5 grams (0.83 mole).
Hexachlorobenzene _____ 47.2 grams (0.166 mole).
Sodium hydroxide (98 percent) 7.7 grams (0.190 mole).

The reaction proceeded as described in Example II and the product was isolated as follows:

The dimethyl formamide was distilled under reduced pressure. The residue was dissolved in toluene and the excess trimethylolpropane extracted with water. The water layer was separated and the toluene stripped under reduced pressure. The melting point of the recrystallized product was 118° C. which corresponds to the melting point of 2-pentachlorophenoxymethyl-2-ethyl-1,3-propane-diol. The hydroxyl (OH) value was 298 (theoretical 294).

Example VI

Two hundred eighty-four and eight-tenths (284.8) grams (1 mole) of hexachlorobenzene, 68.1 grams (0.5 mole) of pentaerythritol, and 2130 grams of dimethyl formamide were charged into a glass reactor, stirred and heated to 135° C. Forty six and six-tenths (46.6) grams of sodium hydroxide (98.7 percent) was added in 7 equal portions over a 3 hour period, the reaction temperature being maintained in the range of 135° C. to 145° C. The reaction was continued at reflux temperature for an additional 7½ hours after the final sodium hydroxide addition. The reaction mixture was filtered while hot. The filter cake consisted of 54.1 grams of sodium chloride (theory 58.5 grams). Upon cooling a product crystallized from the filtrate. The product was recrystallized from benzene and white crystals were obtained. The product obtained was essentially 2,2'-pentachlorophenoxymethyl-1,3-propane-diol.

*Example VII*

In this example, Example I is repeated substituting a mole of hexabromobenzene for the hexachlorobenzene. 2 - pentabromophenoxymethyl-2-ethyl-1,3-propane-diol is obtained in good yield.

*Example VIII*

This example illustrates the preparation of epoxy resins utilizing the novel halogen containing compounds of this invention.

One hundred twenty-eight and four-tenths (128.4) grams of the reaction product of Example I, consisting predominantly of 2-pentachlorophenoxymethyl-2-ethyl-1,3-propanediol, and 252.0 grams (2.72 moles) of epichlorohydrin were admixed in a flask equipped with a stirrer, reflux condenser, azeotropic adapter, and temperature measuring means. This mixture was stirred and heated to reflux at 85° C. under vacuum. When the reflux temperature was reached, 27.6 grams (0.675 moles) of sodium hydroxide was added in 5 separate portions over a period of 70 minutes. After the first addition of sodium hydroxide, at which time the formation of water and sodium chloride was observed, the reaction was continued for an additional 440 minutes, although after all of the sodium hydroxide was added the pH of the reaction mixture was found to be approximately 7.0. Substantially the theoretical amount of water was collected during the reaction. After cooling, the reaction mixture was filtered and a clear, dark yellow filtrate was obtained. The excess epichlorohydrin was distilled off under a vacuum of 10 mm.–20 mm. of mercury to a pot temperature of 150 ° C. During the distillation a small amount of a white solid, found to be hexachlorobenzene, formed around the flask. One hundred forty-seven and seven-tenths (147.7) grams of a dark yellow resin was obtained. This resin had the following properties:

| | |
|---|---|
| Epoxy equivalent | 397.8 |
| Percent hydrolyzible chlorine | 0.11 |
| Percent total chlorine | 34.0 |
| Viscosity (c.p.s./25° C.) | 20000–25000 |

One hundred (100) grams of the epoxy resin thus obtained was catalyzed with 12.44 grams of p,p'-methylenedianiline, and cast into a rectangular shape. The casting was gelled at 200° F. in an oven for one hour, and post cured at 350° F. for an additional 3 hours. The casting was placed in a flame for 30 seconds and removed. After only 3 seconds the flame extinguished, thus demonstrating the extremely good flame resistance properties of the epoxy resin.

*Example IX*

A polyester resin was prepared from the reaction product of Example I and consisting predominantly of 2-pentachlorophenoxymethyl-2-ethyl-1,3-propane-diol, by reacting the reaction product with maleic anhydride. Four hundred thirty-six (436) grams of the reaction product, and 125 grams of maleic anhydride were heated by the fusion method for 6 hours at a maximum temperature of 195° C. The resulting polyester had an acid number of 34 and a viscosity of $Z_2+$ at 16 percent solids in ethylene glycol monoethyl ether.

Seventy-five (75) parts of this polyester was admixed with 25 parts of styrene and 0.015 percent by weight of hydroquinone. The resulting mixture was catalyzed with 1.0 percent by weight of benzoyl peroxide and a casting made. The casting was cured for 1 hour at 170° F. and for an additional hour at 250° F. The casting had the following properties:

| | |
|---|---|
| Barcol Hardness | 48–54. |
| Water absorption | 0.043 percent. |
| Heat distortion | 85° C. |
| Impact resistance (Izod) | 0.117 ft. lbs./in. |
| Flexural strength | 7600 p.s.i. |
| Flexural modulus | $6 \times 10^5$. |

The casting was completely self extinguishing when tested by the method of A.S.T.M. D-635.

Although specific examples have been set forth hereinabove, it is not intended that the invention be limited solely thereto, but to include all of the variations and modifications falling within the scope of the appended claims.

This application is a continuation-in-part of copending application, Serial No. 702,530, filed December 3, 1957, and now abandoned.

I claim:
1. A chemical compound of the structure

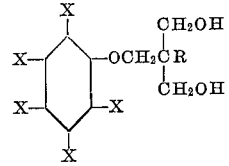

wherein X is at least one member selected from the group consisting of fluorine, chlorine, bromine and iodine and R is a lower alkyl group having from 1 to 6 carbon atoms.

2. The compound of claim 1 wherein X is chlorine.
3. 2 - pentachlorophenoxymethyl - 2 - ethyl - 1,3 - propanediol.
4. 2 - pentachlorophenoxymethyl - 2 - methyl - 1,3-propanediol.
5. The method of preparing a compound of the structure

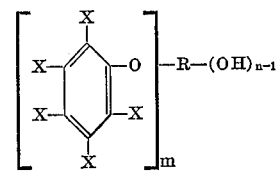

wherein each X is a halogen atom, R is a saturated aliphatic hydrocarbon radical containing from 4 to 9 carbon atoms, m is a whole number from 1 to 2, and n is a whole number from 3 to 4, but when n is 4, m is 1 which comprises bringing together at a temperature in the range of 50° C. to 200° C. a hexahalobenzene and a polyol of the structure

wherein R is a saturated aliphatic hydrocarbon radical containing from 4 to 9 carbon atoms, and n has the significance given above, in the presence of a hydrogen halide acceptor and in a solvent selected from the group consisting of dialkyl ethers of glycols and dialkyl carboxylic acid amides.

6. The method of claim 5 wherein the polyol is trimethylolpropane.
7. The method of claim 5 wherein the polyol is trimethylolethane.
8. The method of claim 5 wherein the polyol is pentaerythritol.

References Cited in the file of this patent

UNITED STATES PATENTS

| | | |
|---|---|---|
| 2,416,263 | MacMullen | Feb. 18, 1947 |
| 2,913,499 | Dazzi | Nov. 17, 1959 |
| 2,946,806 | Nentwig et al. | July 26, 1960 |

FOREIGN PATENTS

| | | |
|---|---|---|
| 788,278 | Great Britain | Dec. 23, 1957 |